United States Patent [19]

Langdon et al.

[11] Patent Number: 4,821,847

[45] Date of Patent: Apr. 18, 1989

[54] LIQUID COOLED BRAKE UNIT

[75] Inventors: David W. Langdon, Hamilton, Ohio; Michael J. Sharratt, Utica, Mich.

[73] Assignee: Force Control Industries, Inc., Fairfield, Ohio

[21] Appl. No.: 138,935

[22] Filed: Dec. 29, 1987

[51] Int. Cl.⁴ .............. B60T 13/04; F16D 65/14; F16D 65/78

[52] U.S. Cl. .................. 188/171; 188/217; 188/264 D

[58] Field of Search ............ 188/71.6, 72.3, 171, 188/264 D, 264 CC, 217; 192/90, 113 B, 70.12

[56] References Cited

U.S. PATENT DOCUMENTS

| | | | |
|---|---|---|---|
| 2,009,121 | 7/1935 | Price | 188/171 |
| 2,025,098 | 12/1935 | Dudick. | |
| 2,884,107 | 4/1959 | Frankel. | |
| 3,094,194 | 6/1963 | Kershner | 188/71.6 X |
| 3,999,634 | 12/1976 | Howell | 188/71.6 |
| 4,079,820 | 3/1978 | Mattli | 192/90 X |
| 4,415,067 | 11/1983 | Cory. | |
| 4,474,268 | 10/1984 | Dayen | 188/71.6 X |

FOREIGN PATENT DOCUMENTS

| | | | |
|---|---|---|---|
| 2730168 | 1/1979 | Fed. Rep. of Germany | 188/171 |
| 0107132 | 8/1980 | Japan | 188/71.6 |
| 0903655 | 8/1962 | United Kingdom | 188/264 D |

Primary Examiner—Andres Kashnikow
Assistant Examiner—Richard Potosnak
Attorney, Agent, or Firm—Jacox & Meckstroth

[57] ABSTRACT

A two-piece housing having a base section and a closure section, is mounted on a motor or other machine having a projecting shaft, and the housing encloses a series of annular brake discs mounted on a hub member which receives the shaft. The discs interfit between a series of non-rotating annular brake plates supported by the base section of the housing, and the hub member is also effective to circulate cooling oil within the housing and outwardly between the plates and discs. A non-rotating annular thrust plate and a set of circumferentially spaced springs are located adjacent the base section and compress the plates and discs together and against the closure section for braking the shaft. A set of circumferentially spaced solenoids are mounted on the closure housing section and have corresponding armature rods or members which extend axially into the housing to push the thrust plate against the springs when the solenoids are energized to release the plates and discs. In a modification, the thrust plate is split into annular sections which have clearance holes for certain springs and armature members to provide for selectively braking the shaft with different torques. The cooling oil also flows into the solenoids.

7 Claims, 1 Drawing Sheet

LIQUID COOLED BRAKE UNIT

BACKGROUND OF THE INVENTION

In the art of liquid cooled brake units for stopping the rotation of a shaft, for example, of the type disclosed in U.S. Pat. No. 4,415,067 which issued to the Assignee of the present invention, it is sometimes desirable to provide for operating the brake unit with electrically actuating means to avoid extending an air supply line from an air compressor or an air supply system. Also, some air supply systems pick up dirt and moisture which can require more frequent servicing of an air actuated brake unitl it is further desirable for an electrically actuated brake unit to provide for simplified and economical construction which also provides for dependable operation over an extended period of of use in addition to simplified assembly and servicing. Furthermore, in some installations, it is desirable for an electrically actuated brake unit to provide for stopping a shaft with selectively different braking torques. For example, when an electrically actuated brake is used on the slide drive for a machine tool carriage or table, a high torque may be used to stop the slide drive motor and a low torque may be used to produce a predetermined thrust or force of the slide against a positive stop during a machining operation.

One form of oil-cooled electromagnetic brake is disclosed in U.S. Pat. No. 2,884,107. In this patent, a large annular magnetic coil and an annular armature plate surround or are concentric with the shaft which requires braking. Another form of dry-type electrically actuated brake is disclosed in U.S. Pat. No. 2,025,098. In the embodiment shown in FIGS. 3 and 4 of this patent, a set of circumferentially spaced solenoids have cylindrical armatures pivotally connected to pins which support an annular thrust plate located between the solenoids and the stack of brake plates and discs. The braking operation is produced by a set of circumferentially spaced compression springs, and the braking operation is released by retraction of the annular thrust plate with the connecting rods when the solenoid coils are energized.

SUMMARY OF THE INVENTION

The present invention is directed to an improved liquid cooled brake unit which is electrically actuated and does not require a source of compressed air for actuating the brake unit. The brake unit of the invention provides all of the desirable features mentioned above and is especially constructed to provide for an extended service life with hundreds of thousands of cycles. The liquid cooled brake unit of the invention not only has a simplified and economical construction and provides for simplified assembly and servicing, but also provides for efficient cooling of the brake and actuating solenoids and is adapted to provide for braking the shaft with different torques.

In general, the above features and advantages of a preferred liquid cooled brake unit constructed in accordance with the invention are provided by a two-piece housing including an annular base section coupled to a closure section which may be annular for braking a through shaft or closed when it is desired to brake the end portion of a projecting shaft. The housing surrounds a tubular hub portion which mounts on and is supported by the shaft and has an outwardly projecting annular portion which defines an inlet. The annular portion supports a set of annular brake discs disposed in interfitting rotation with a set of brake plates supported by lugs projecting from the base section of the housing. A generally square annular thrust plate is also supported by the lugs adjacent the stack of brake plates and discs and is urged towards the stack by a set of circumferentially spaced compression springs for braking the hub member and the shaft.

A set of circumferentially spaced solenoids have cylindrical shells which are sealed to the closure section of the housing and include corresponding armature rods which project into the housing past the stack of plates and discs to corner portions of the thrust plate. When the solenoids are energized, the thrust plate is pushed by the armature rods towards the base section of the housing and against the compression springs to release the brake discs from the brake plates. Cooling oil is circulated within the housing and is permitted to flow into the solenoids for cooling the solenoids and for dampening their operation. In another embodiment, the non-rotating annular thrust plate is split into annular sections, and the solenoid rods and compression springs are selected and arranged to provide for dual braking torques for the shaft.

Other features and advantages of the invention will be apparent from the following description, the accompanying drawing and the appended claims.

DESCRIPTION OF THE PREFERRED EMBODIMENTS

Figure 1:
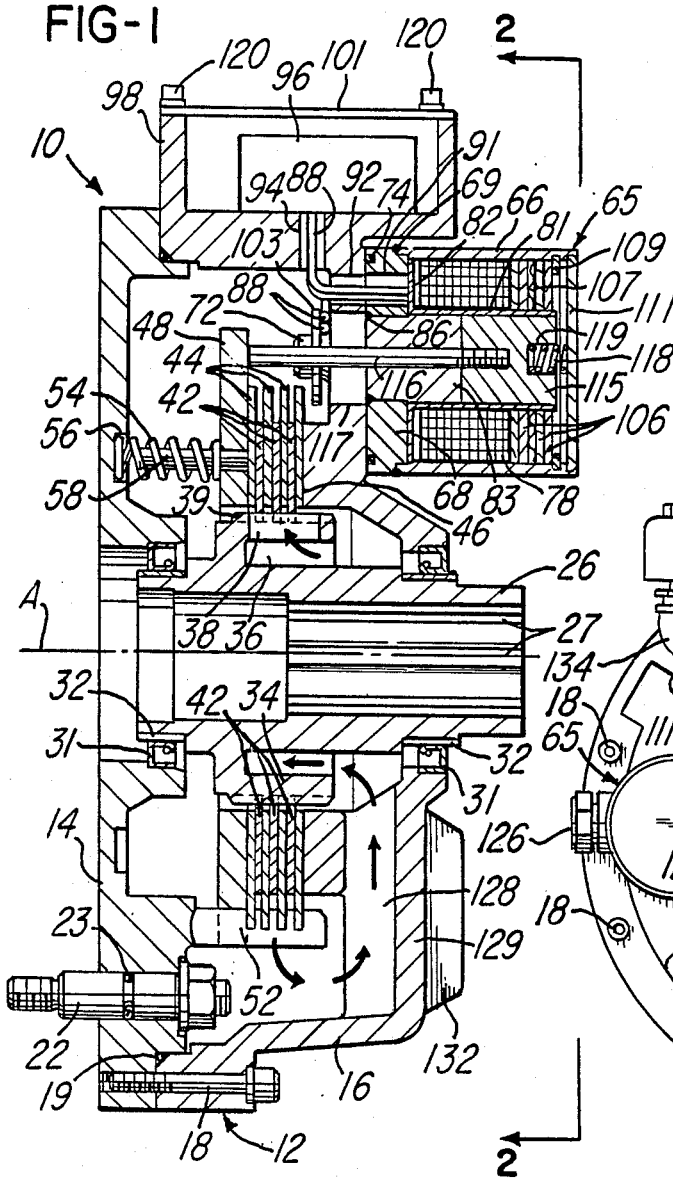
FIG. 1 is an axial section of a liquid cooled brake unit constructed in accordance with the invention and taken generally on the line 1—1 of FIG. 2.
Figure 2:
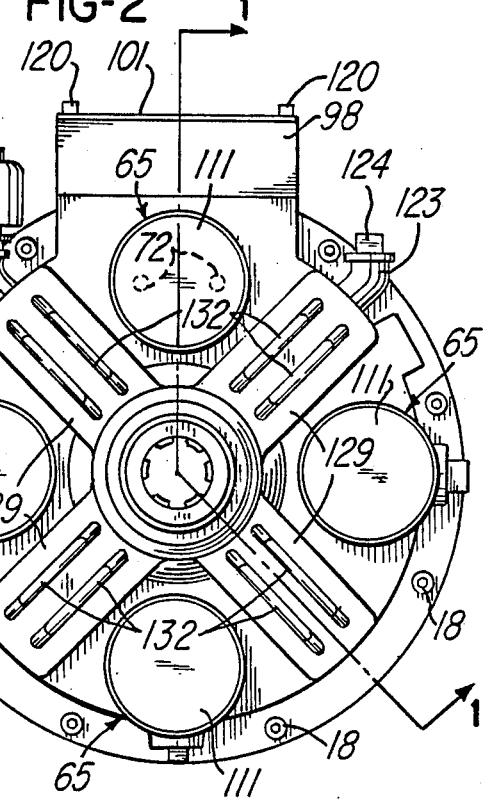
FIG. 2 is a reduced end view of the brake unit as taken generally on the line 2—2 of FIG. 1.

FIGS. 1 and 2 illustrate a liquid cooled brake unit or assembly 10 constructed in accordance with the invention and which is adapted to mount on an electric motor or a motor drive unit (not shown) having a projecting shaft, for example, as illustrated in above mentioned U.S. Pat. No. 4,415,067. The assembly 10 includes a two-piece housing 12 formed by an annular base section 14 which mates with an annular closure section 16. The sections 14 and 16 are secured together by peripherally spaced screws 18, and a resilient O-ring 19 forms a fluid-tight seal between the sections.

The housing 12 is adapted for mounting on a motor or other machine having a projecting shaft (not shown), and the base section 14 is secured to the machine by a set of circumferentially spaced bolts 22 each of which is sealed to the housing section 14 by a resilient O-ring 23. the housing 12 surrounds an annular or tubular hub member 26 which has an internal spline 27 to secure the hub member 26 for rotation with the shaft which projects into or through the hub member 26. A set of flexible sealing rings 31 are supported by the housing 12 and contact corresponding hardened cylindrical sleeves 32 mounted on the hub member 26.

The hub member 26 has an outwardly projecting annular portion 34 which defines an annular inlet 36, and the annular portion has circumferentially spaced slots or openings 38 and a peripherally extending spline 39. A series of annular flat circular brake discs 42 are mounted on the spline 39 of the annular portion 34 for rotation with the hub member 26 and for limited axially sliding movement. The brake discs 42 are arranged in interfitting relation with a set of flat annular brake plates 44 to form a stack of interfitting brake plates and discs which are positioned between a flat annular surface 46 on the housing closure section 16 and a flat generally square annular thrust plate 48.

The brake plates 44 are generally circular with four peripherally spaced notches or recesses for receiving a corresponding set of four lugs 52 formed or cast as an integral part of the base housing section 14. The lugs 52 prevent rotation of the brake plates 44, and the thrust plate 48 also has four peripherally spaced notches or recesses for receiving the lugs 52 to prevent rotation of the thrust plate 48. The brake plates 44 and the thrust plate 48 are free to move axially by a slight amount on the lugs 52. The thrust plate 48 is normally urged towards the opposing surface 46 by a set of circumferentially spaced compression springs 54 which seat within corresponding recesses 56 within the housing section 14. The springs 54 are mounted on corresponding cylindrical roll pins 58 having end portions pressed into the thrust plate 48. The axial force exerted by the springs 54 is effective to clamp or compress the stack of brake discs and plates together and against the surface 46 to brake rotation of the discs 42, the hub member 26 and the shaft.

A set of four electrically actuated solenoids 65 are mounted on the closure section 16 of the housing 12 at uniformly spaced locations, and each solenoid 65 includes a cylindrical metal shell 66 which is secured to a circular end ring 68 by a peripherally extending weld 69. A pair of diametrically spaced screws 72 extend through corresponding holes within the housing section 16 and are threaded into the end ring 68 of each solenoid 65 for removably securing each solenoid to the housing section 16. A resilient O-ring 74 forms a fluid-tight seal between each solenoid end ring 76 and the housing section 16.

The cylindrical shell 66 of each solenoid 65 encloses a wound copper wire coil 78 which surrounds a thin metal tube or sleeve 81 having an end flange 82 mounted on a tubular metal pole piece 83 secured to the end ring 68 by an annular weld 86. A pair of lead wires or electrical conductors 88 extend from each coil 78 through a set of aligned holes 91 and 92 within the end ring 78 and closure section 16 and are directed within the housing 12 through a hole 94 within the top of the housing section 16 to a junction box 96. The junction box 96 is located within a generally square cup-shaped portion 98 of the housing section 16, and the portion 98 is closed with a flat cover plate 101 removably secured by a set of screws 120. A set of washers 103 are mounted on some of the screws 72 to clamp the wire conductors 88 within the housing 12.

Each of the solenoid shells 66 also encloses a set of metal spacer washers 106 and a wavy spring washer 107 which are retained within the shell with the coil 78 by a spring retaining ring 109. A flat circular plate 111 closes the outer end of each shell 66, and the end portion of the shell is rolled over a tapered peripheral edge of the plate 111 to form a positive lock and a fluid-tight seal. A cylindrical armature 115 is supported for sliding axial movement within the sleeve 81 of each solenoid 65. The armature 115 is threadably connected to a corresponding armature rod 116 which extends through the corresponding bushing 83 and a hole 117 to one of the corner portions of the thrust plate 48. A light compression spring 118 is confined within a cavity 119 within the end of each armature 115 and extends to the end plate 111 for normally biasing or urging the armature rod 116 into contact with the thrust plate 48. The armature 115 and rod 116 may move to the right (FIG. 1) by approximately 0.090 inch before the armature contacts the end plate 111.

In operation of the brake unit described above in connection with FIGS. 1 and 2, the unit is shown in FIG. 1 in a released position before solenoids 65 are energized and with the armature 115 of each solenoid in contact with the bushing 83. The force exerted by the four solenoids 65 through the armature rods 116 against the thrust plate 48 is sufficient to overcome the force exerted by the compression springs 54 so that the springs 54 are compressed. When the solenoids 65 are deenergized, the springs 54 press the thrust plate 48 against the stack of brake discs and plates to compress the stack between the thrust plate and the annular surface 46 to brake rotation of the discs 42 and the hub member 26 mounted on the shaft.

A coolant and lubricating oil is poured into the housing 12 through a fill fitting 123 after the closure plug 124 is removed. The liquid coolant or oil fills the housing 12 to approximately a level defining a horizontal plane extending through the axis A of the hub 26. The oil level may be checked through a sight glass 126. When the hub 26 and brake discs 42 are rotated with the shaft supporting the hub 26, the coolant oil is pumped by centrifugal action in the direction shown by the arrows in FIG. 1. As the cooling oil flows outwardly between the brake discs and plates, it is recirculated or returned to the inlet 36 through passages 128 defined by channel portions of 129 of the housing closure section 16. Preferably, the housing 12 is constructed of cast aluminum for dissipating heat from the recirculating liquid coolant or oil, and the channel portions 129 are provided with parallel ribs 132 to help dissipate the heat from the housing 12 into the surrounding atmosphere.

A breather or vent fitting 134 is connected to one of the upper passages 128 to prevent a build up of gas pressure within the housing 12 as the liquid coolant or oil recirculates from the lower portion of the housing 12 into the inlet 36 of the hub member 26. Some of the recirculating oil within the housing 12 also flows outwardly along each of the armature rods 116 and into the outer end portion of each solenoid shell 66 to provide for lubricating and cooling the solenoid 65 and also provide for a hydraulic dash pot or dampener to the movement of the armature 115 within each solenoid.

Figure 3:
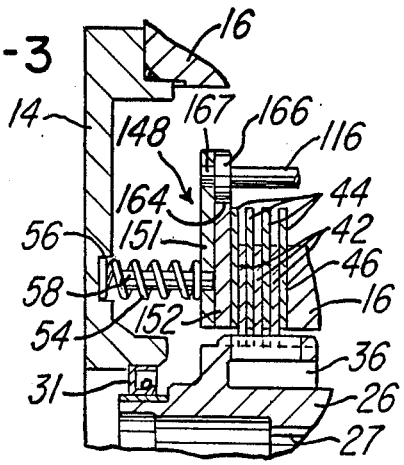
FIGS. 3 and 4 are fragmentary sections of the brake unit shown in FIGS. 1 and 2 and with a modification to provide for dual torque braking of a shaft.
Figure 4:
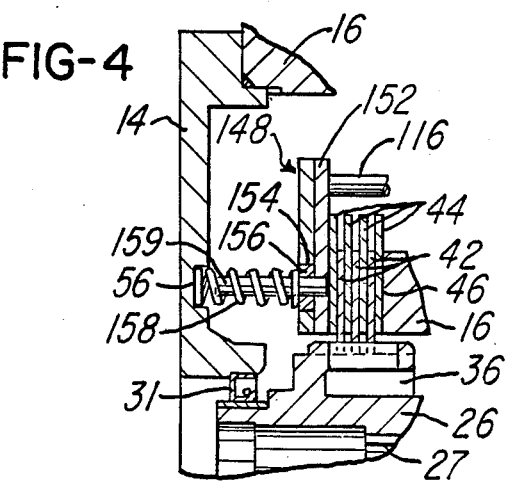

Referring to FIGS. 3 and 4, it is sometimes desirable for the brake unit to provide for braking the hub 26 and the supporting shaft with different braking torques in response to selective actuation of the solenoids 65. In this modification, a generally square annular thrust plate 148 is split and includes two flat annular sections 151 and 152. The thrust plate section 151 (FIG. 4) has two diametrically disposed clearance holes 154 which receive corresponding circular washers 156. The corresponding set of compression springs 158 engage the washers 156 and are positioned on corresponding roll pins 159 pressed into holes in the thrust plate section 152. As shown in FIG. 3, the thrust plate section 152 has a pair of diametrically disposed clearance holes 164 which receive a corresponding pair of buttons 166 each having a projection 167 pressed into a hole within the thrust plate section 151. Thus two of the armature rods 116 engage the thrust plate section 152, and the other two armature rods engage the buttoms 166.

When all four of the solenoids 65 are energized, all of the springs 54 and 158 are compressed for completely releasing the stack of brake discs and plates. When all of the solenoids 65 are deenergized, the compression springs 54 and 158 are effective to compress the stack of brake discs and plates and apply maximum braking torque to the hub member 26. When only the solenoids 65 which have armature rods 116 engaging the buttons 166 are energized, only the springs 54 (FIG. 3) are compressed and the thrust plate section 151 separates from the section 152. As a result, the springs 158 and thrust plate section 152 apply a reduced compression of the stack of brake discs and plates in order to brake the rotation of the hub member 26 with a lower torque.

From the drawing and the above description, it is apparent that a brake unit constructed in accordance with the present invention, provides desirable features and advantages. For example, the components of the brake unit 10 are economical to produce and machine, and the brake unit is simple to assemble and service. The brake unit also provides for an extended service life with minimum maintenance as a result of the cooling of the recirculating oil within the housing 12 and the cooling of the exposed solenoid 65 by the air flowing around the thin metal shells 66. In addition, the oil which flows into the solenoids 65 aids in cooling the solenoids and also provides for hydraulic dampening of the solenoid armatures 115 so that the armatures are cushioned and shock is minimized. The abutting engagement of the armature rods 116 against the thrust plate 48 or 148 also eliminates any side loading on the armature rods, and the light springs 118 provide a preloading of the armature rods against the thrust plate to avoid wear on the ends of the armature rods and on the contacting portions of the thrust plate. Another important feature is provided by the split thrust plate 148 which provides for multiple or dual braking torques on the hub member 26 and the supporting shaft. In addition, the arrangement of the pushtype solenoid rods 116 on the thrust plate 48 or 148 also accommodates wear of the brake discs and plates over an extended period of use without requiring any adjustments.

While the forms of an oil cooled brake unit herein described constitute preferred embodiments of the invention, it is to be understood that the invention is not limited to these precise forms, and that changes may be made therein without departing from the scope and spirit of the invention as defined in the appended claims.

The invention having thus been described, the following is claimed:

1. Apparatus for braking the speed of a shaft projecting from a motor or other machine, comprising a hub member having a center bore for receiving the shaft and including a support portion, means for securing said hub member to the shaft for rotation therewith, a plurality of annular brake discs mounted on said support portion of said hub member for rotation therewith and for axial movement relative to said hub member, means defining circumferentially spaced passages around said support portion of said hub member, a non-rotatable housing surrounding said hub member and including an annular base section adapted to be mounted on the machine, a closure section coupled to said base section, a liquid coolant within said housing, a plurality of non-rotatable annular brake plates disposed between said brake discs in interfitting relation and connected to said housing, said coolant being forced outwardly through said passage and between said brake discs and plates in response to rotation of said hub member and said brake discs, means within said housing for directing the coolant from said brake discs and plates to said passages, an annular non-rotatable thrust plate supported by said base section of said housing generally concentrically with said hub member and for axial movement relative to said hub member, a plurality of electrically actuated solenoids mounted on said closure section of said housng in circumferentially spaced relation and projecting outwardly from said housing for exposure to air flowing around said housing, each of said solenoids including an armature rod projecting axially into said housing and past said interfitting annular brake discs and plates to said non-rotatable thrust plate, spring means supported by said base section of said housing for moving said thrust plate axially towards said closure section to effect axial compression of said brake discs and plates for braking the shaft, said thrust plate being movable towards said base section to release said brake discs and plates and the shaft in response to energizing said solenoids and axial movement of the corresponding said armature rods further into said housing, wherein said thrust plate includes a first annular section and a second annular section, at least two of said solenoids and corresponding said armature rods being disposed for moving said first section independent of said second section, and at least two of said solenoids and corresponding said armature rods being disposed for moving both said first and second sections to provide for selecting different torques for braking the rotation of the shaft.

2. Apparatus as defined in claim 1 wherein said first and second sections of said thrust plate are arranged in adjacent relation, and said second thrust plate section has clearance holes for said armature rods disposed for moving said first thrust plate section.

3. Apparatus as defined in claim 1 wherein said spring means for moving said thrust plate sections comprise a series of circumferentially spaced and axially extending compression springs for urging said thrust plate sections in a direction to effect axial compression of said brake discs and plates, and said first thrust plate section has circumferentially spaced clearance holes for some of said springs disposed for moving only said second thrust plate section.

4. Apparatus for braking or controlling the speed of a shaft, comprising a hub member having a center bore for receiving the shaft and including a portion defining a liquid coolant inlet, means for securing said hub member to the shaft for rotation therewith, a plurality of annular brake discs mounted on said portion of said hub member for rotation therewith and for axial movement relative to said hub member, said portion of said hub member having circumferentially spaced passages connecting said inlet to the inner portions of said brake discs, a housing surrounding said hub member and including an annular base section coupled to a closure section, a liquid coolant within said housing, a plurality of non-rotatable annular brake plates disposed between said brake discs in interfitting relation and connected to said housing, said coolant flowing outwardly from said inlet through said passages and between said brake discs and plates in response to rotation of said hub member and said brake discs, means defining passages within said housing for recirculating said coolant from said brake discs and plates and into said inlet of said hub member, first and second non-rotating annular thrust plates supported by said base section of said housing generally concentrically with said hub member and for axial movement relative to said hub member, a plurality of electrically actuated solenoids supported by said closure section of said housing, each of said solenoids including an armature member projecting axially past said brake plates and discs to said thrust plate, spring means for moving said thrust plates axially to effect axial compression of said brake discs and plates and braking of said hub member and the shaft, at least two of said solenoids and corresponding said armature members connected to move said first thrust plate independent of said second thrust plate and at least two of said solenoid and corresponding said armature members connected to move simultaneously both said first and second thrust plates, to provide for selecting different torques for braking the rotation of the shaft in response to selectively energizing said solenoids.

5. Apparatus as defined in claim 4 wherein said first and second thrust plates are arranged in adjacent relation, and said second thrust plate has clearance holes for said armature members disposed for moving said first thrust plate.

6. Apparatus as defined in claim 4 wherein said spring means for moving said thrust plates comprise a series of circumferentially spaced and axially extending compression springs, and said first thrust plate has circumferentially spaced clearance holes for some of said springs disposed for moving said second thrust plate.

7. Apparatus for braking the speed of a shaft projecting from a motor or other machine, comprising a hub member having a center bore for receiving the shaft for rotation therewith, a plurality of annular brake discs mounted on said support portion of said hub member for rotation therewith and for axial movement relative to said hub member, means defining circumferentially spaced passages around said support portion of said hub member, a non-rotatable housing surrounding said hub member and including an annular base section adapted to be mounted on the machine, a closure section coupled to said base section, a liquid coolant within said housing, a plurality of non-rotatable annular brake plates disposed between said brake discs in interfitting relation and connected to said housing, said coolant being forced outwardly through said passages and between said brake discs and plates in response to rotation of said hub member and said brake discs, means within said housing for directing the coolant from said brake discs and plates to said passages, an annular non-rotatable thrust plate supported by said base section of said housing generally concentrically with said hub member and for axial movement relative to said hub member, a plurality of electrically actuated solenoids mounted on said closure section of said housing in circumferentially spaced relation and projecting outwardly from said housing for exposure to air flowing around said housing, each of said solenoids including an armature rod projecting axially into said housing and past said interfitting annular brake discs and plates to said non-rotatable thrust plate, spring means supported by said base section of said housing for moving said thrust plate axially towards said closure section to effect axial compression of said brake discs and plates for braking the shaft, said thrust plate being movable towards said base section to release said brake discs and plates and the shaft in response to energizing said solenoids and axial movement of the corresponding said armature rods further into said housing, wherein each of said solenoids includes a metal shell surrounding an annular wire coil, one of said armature rods disposed within each of said coils and projecting axially through a hole within said closure section of said housing, and said hole within said closure section for each of said armature rods provides for the flow of said liquid coolant within said housing into said shell for cooling said solenoids and dampening the movement of said armature members.

* * * * *